UNITED STATES PATENT OFFICE.

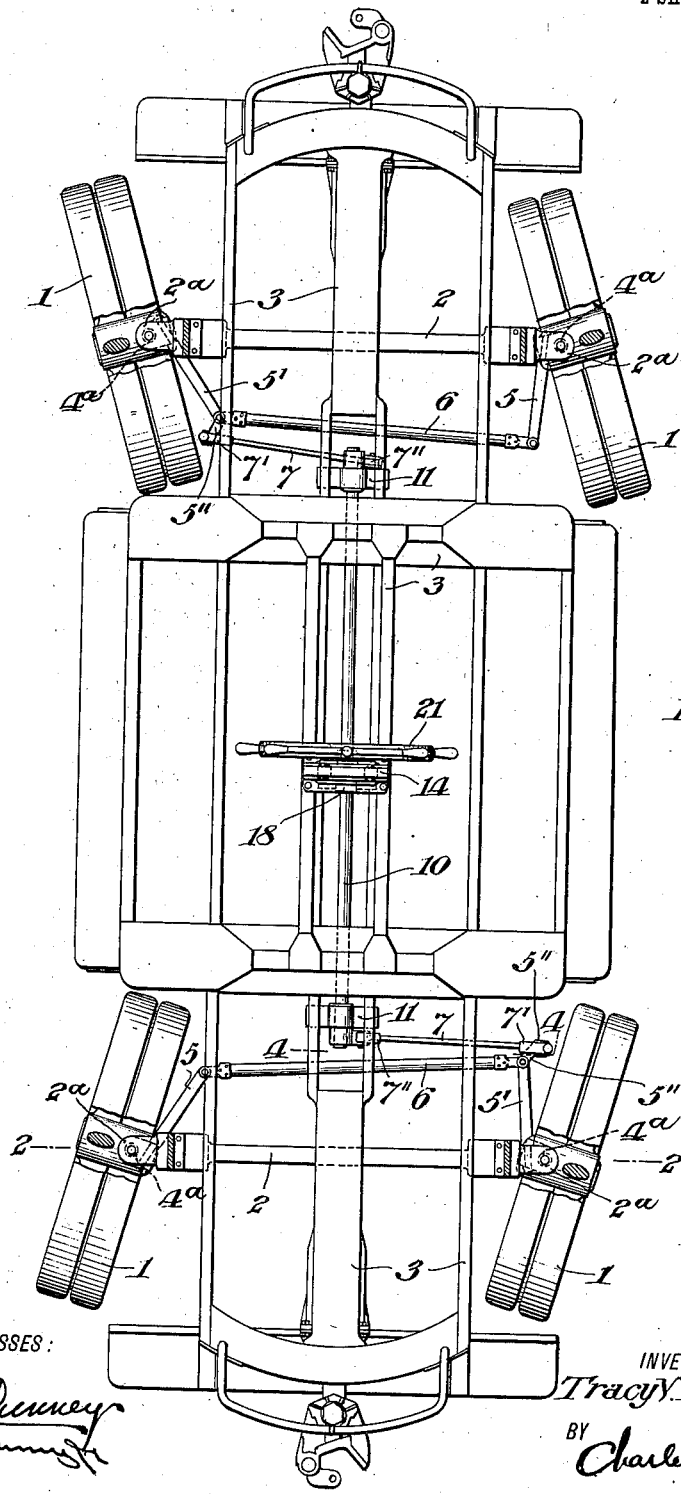

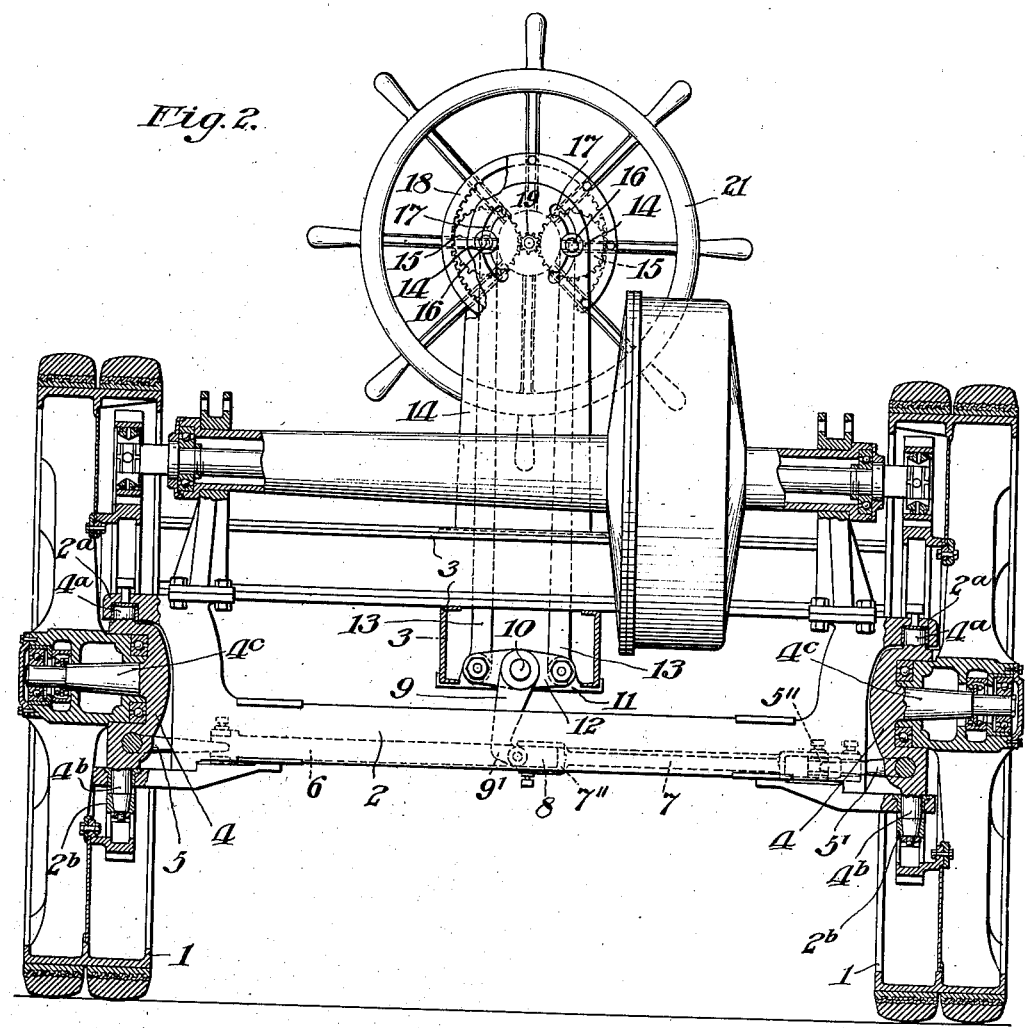

TRACY V. BUCKWALTER, OF ALTOONA, PENNSYLVANIA.

TRACTOR.

1,090,447.   Specification of Letters Patent.   Patented Mar. 17, 1914.

Application filed January 21, 1913. Serial No. 743,291.

*To all whom it may concern:*

Be it known that I, TRACY V. BUCKWALTER, a citizen of the United States, residing at Altoona, in the county of Blair and State of Pennsylvania, have invented certain Improvements in Tractors, of which the following is a specification.

My invention relates more particularly to improved means for steering tractors, but it will be understood that it is applicable to more general use. It is adapted especially for turning traction wheels on the axes of knuckles with which they are connected, and its leading object is to provide simple, durable and efficient means for simultaneously shifting the wheels at the opposite ends of the tractor in opposite directions.

In the accompanying drawings, Figure 1 is a plan view of the frame and wheels of a tractor having my improvements applied thereto, parts being shown in section; Fig. 2 is an irregular sectional view taken on the line 2—2 of Fig. 1, Fig. 3 is a sectional view taken on the line 3—3 of Fig. 2, Fig. 4 is a sectional view showing details taken on the line 4—4 of Fig. 1, and Fig. 5 is a top plan view of the steering wheel and connections, the housing being broken away.

The improvements, in the form illustrated in the drawings, are applied to a tractor engine comprising the wheels 1, the axles 2 which carry the frame 3, the knuckles 4 having the vertical journals $4^a$ and $4^b$ engaging the axle bearings $2^a$ and $2^b$ and the spindles $4^c$ on which the wheels are journaled, the arms 5 and 5' fixed to the respective knuckles, and the links 6 each pivotally connected to an arm 5 and a corresponding arm 5'. Rods 7 are provided with yokes 7' pivotally connected with arms 5'' (of the respective levers 5') extending beyond the links 6, and with the yokes 7''' pivotally connected to blocks 8 which are pivotally connected within the yokes 9' of the respective arms 9, whereby the parts 7 and 9 are connected by gimbal joints.

The arms 9 are fixed on the opposite ends of a rod 10 extending longitudinally of the frame 3 and journaled in the bearings 11 carried thereby. A lever 12 is fixed at its center on the shaft 10 intermediately thereof and rods 13 are pivotally connected at their lower ends to the respective ends or arms of the lever. These rods are housed within a casing 14 mounted on the frame 3. Gear wheels 15 are journaled (within the casing) by the spindles 16 connected with the upper ends of the rods 13, the spindles being guided by slots 17 in the casing. The gear wheels 15 mesh with the circular rack 18 carried within the casing or housing and with a pinion 19 fixed on the shaft 20 journaled in the casing, the shaft 20 having a steering wheel 21 fixed thereon.

In operation, when the traction wheels 1 are parallel to the longitudinal axis of the machine, or the latter is moving straight ahead, the steering mechanism is in the neutral position shown in Fig. 2. When it is desired to shift the traction wheels, say to the position shown in Fig. 1, the steering wheel 21 is turned, the pinion 19 is revolved and revolves the gear wheels 15, which are also given a planetary movement by reason of their engagement with the internally toothed stationary gear 18. The planetary movement of the wheels 15 moves the rods 13 in opposite directions and thereby rocks the lever 12, shaft 10 and arms 9, the latter acting through the rods 7, the arms 7', the links or connecting rods 6, and the arms 5 and 5' upon the knuckles 4 by which the wheels 1 are shifted.

Having described my invention, I claim:

1. The combination with two sets of traction wheels, knuckles connected therewith and arms on said knuckles whereby they are oscillatable on their axes, of a journaled shaft, arms fixed on said shaft, means for connecting the arms of said shaft with the arms of said knuckles, whereby said shaft is adapted to shift the respective sets of wheels simultaneously in opposite directions, a revoluble steering wheel, and means comprising gears connecting said wheel and shaft.

2. The combination with traction wheels and knuckles connected therewith, of a journaled shaft, means connecting said shaft and knuckles, a pair of arms fixed to said shaft, a pair of gear wheels, rods connecting said gear wheels with said arms, a toothed member by which said gear wheels are fulcrumed and means comprising a pinion engaging said gear wheels.

3. The combination of a frame, traction wheels, and knuckles connecting said frame and wheels, with a journaled shaft extending longitudinally of said frame, means connecting said shaft and knuckles whereby the rocking of said shafts shifts said wheels, and means for rocking said shaft, said last named means comprising a pair of reciprocating rods, gear wheels journaled on said rods, a spur gear engaging said gear wheels, and a circular rack concentric to said spur gear and engaging said gear wheels.

4. The combination of the traction wheels, knuckles therefor, arms on said knuckles, a journaled shaft, an arm fixed on said shaft, means comprising a rod connecting the arm on said shaft with the arms on said knuckles, and means for rocking said shaft, said last named means comprising a pair of rods, gear wheels journaled on said rods, a toothed member by which said gear wheels are engaged, a journaled steering wheel, and a second toothed member movable by said steering wheel and engaging said gear wheels.

5. The combination of a frame, traction wheels, knuckles whereby said wheels support said frame, arms whereby said knuckles are oscillated on their axes to shift said wheels, a longitudinal shaft journaled on said frame, means comprising arms fixed to said shaft and rods connected to said last named arms whereby said first named arms are shifted, a lever fixed on said shaft, rods connected to the arms of said lever, revoluble gear wheels carried by said last named rods, a toothed member on which said gear wheels are fulcrumed, a revoluble steering wheel, and a toothed member revoluble by said steering wheel and engaging said gear wheels.

6. The combination of a frame, traction wheels, knuckles whereby said wheels support said frame, arms whereby said knuckles are oscillatable on their axes to shift said wheels, a longitudinal shaft journaled on said frame, means connecting said shaft and arms, a second journaled shaft, a wheel for operating said shaft, and means connecting said shafts.

7. The combination of a frame, traction wheels for supporting the respective ends thereof, knuckles connecting said wheels with said frame, means for shifting said knuckles and wheels at the opposite ends of said frame simultaneously in opposite directions, said means comprising a shaft extending longitudinally of said frame and adapted to be rocked to effect said movement, and means whereby said shaft is rocked, said last named means comprising a gear wheel, a spur gear engaging said gear wheel and an internally toothed rack engaging said gear wheel.

8. The combination of traction wheels, knuckles connected therewith and means for rocking said knuckles and shifting said wheels, said means comprising a rock shaft, a hand operated steering device and planetary mechanism operated by said device.

In testimony whereof I have hereunto set my hand this 20th day of January, 1913, in the presence of the subscribing witnesses.

TRACY V. BUCKWALTER.

Witnesses:
GEO. U. CUNNEY,
JOS. G. DENNY, Jr.